(12) United States Patent
Zhong et al.

(10) Patent No.: US 11,217,959 B2
(45) Date of Patent: Jan. 4, 2022

(54) BROADBAND OPTICAL PARAMETRIC CHIRPED PULSE AMPLIFIER INSENSITIVE TO TEMPERATURE

(71) Applicant: SHENZHEN UNIVERSITY, Guangdong (CN)

(72) Inventors: Haizhe Zhong, Guangdong (CN); Dahua Dai, Guangdong (CN); Chengchuan Liang, Guangdong (CN); Zhaoxing Liang, Guangdong (CN); Botian Wang, Guangdong (CN); Ying Li, Guangdong (CN); Dianyuan Fan, Guangdong (CN)

(73) Assignee: Shenzhen University, Shenzhen (CN)

( * ) Notice: Subject to any disclaimer, the term of this patent is extended or adjusted under 35 U.S.C. 154(b) by 1 day.

(21) Appl. No.: 16/849,993

(22) Filed: Apr. 16, 2020

(65) Prior Publication Data

US 2021/0044076 A1 Feb. 11, 2021

Related U.S. Application Data

(63) Continuation of application No. PCT/CN2019/115561, filed on Nov. 5, 2019.

(30) Foreign Application Priority Data

Aug. 6, 2019 (CN) .......................... 201910721527.6

(51) Int. Cl.
*H01S 3/10* (2006.01)
*H01S 3/108* (2006.01)

(52) U.S. Cl.
CPC .......... *H01S 3/10013* (2019.08); *H01S 3/108* (2013.01)

(58) Field of Classification Search
CPC ............ H01S 3/10013; H01S 3/10023; H01S 3/1003; H01S 3/10038; H01S 3/10053;
(Continued)

(56) References Cited

U.S. PATENT DOCUMENTS

| 8,441,720 B2 * | 5/2013 | Borguet ................... G02F 1/39 |
| | | 359/330 |
| 9,246,295 B2 * | 1/2016 | Kaganovich .......... H01S 3/1003 |
| 2005/0238070 A1 * | 10/2005 | Imeshev ............. H01S 3/06758 |
| | | 372/21 |

OTHER PUBLICATIONS

Daolong Tang et al., "Temperature- and wavelength-insensitive parametric amplification enabled by noncollinear achromatic phase-matching", Scientific Reports, Oct. 27, 2016, pp. 1-9, vol. 6, Issue 36059.

* cited by examiner

*Primary Examiner* — Tuan N Nguyen
(74) *Attorney, Agent, or Firm* — Dinsmore & Shohl LLP

(57) ABSTRACT

The present disclosure relates to a broadband optical parametric chirped pulse amplifier insensitive to temperature comprises the first pulsed laser, the second pulsed laser, a pulse stretcher and a periodically poled nonlinear crystal. Via the proper arrangement of the non-collinear angles between the transmission directions of the signal light, the pump light and the idler light, to simultaneously satisfy the angular relationship required for constructing the non-collinear phase-matching configuration insensitive to wavelength and that required for constructing the non-collinear phase-matching configuration insensitive to temperature, the optical parametric chirped pulse amplifier not only can realize a broadband parametric amplification of the signal light (insensitive to wavelength), but also can effectively (Continued)

alleviate the phase mismatch in nonlinear crystal resulted from the excessively high local temperature (insensitive to temperature).

8 Claims, 5 Drawing Sheets

(58) Field of Classification Search
CPC .. H01S 3/10046; H01S 3/1083; H01S 3/1095; G02B 6/4236
USPC .......................................................... 372/21
See application file for complete search history.

BROADBAND OPTICAL PARAMETRIC CHIRPED PULSE AMPLIFIER INSENSITIVE TO TEMPERATURE

CROSS-REFERENCE TO RELATED APPLICATION

This application is a continuation of International Patent Application No. PCT/CN2019/115561 with a filing date of Nov. 5, 2019, which claims a priority of China patent application number 201910721527.6 filed on Aug. 6, 2019, the contents thereof are incorporated herein by reference.

TECHNICAL FIELD

The present disclosure relates to the field of laser technology, in particular to a broadband optical parametric chirped pulse amplifier insensitive to temperature.

BACKGROUND

In the prior art, due to the lack of a suitable laser gain medium (referring to a material system used to realize the population inversion and the light amplification by stimulated emissions of radiation), only a few lasers at specific wavelengths can be directly generated via the stimulated radiation of the laser media. Optical parametric amplification (refers to the phenomenon that a light beam at high-frequency and a light beam at low-frequency enter a non-linear medium at the same time, and the light beam at low-frequency is amplified due to the difference frequency effect, which is referred to as optical parametric amplification. Hereinafter referred to as OPA) can be used to transfer the energy of the pump light with frequency of $\omega_p$ to the signal light with frequency of $\omega_s$ ($\omega_p > \omega_s$). At the same time, a third laser with frequency of $\omega_i$ ($\omega_p = \omega_s + \omega_i$) (referred to as idler light) is obtained. Optical parametric amplifiers have been widely used in scientific research, medicine, industry and other fields to obtain a more powerful pulsed laser. As an effective method to generate ultra-short and ultra-intense pulsed lasers at present, OPA-based Optical Parametric Chirped Pulse Amplifiers (OPCPA) have also been widely used. The basic principle is as follows: a femtosecond broadband signal light of low-energy to be amplified is temporally stretched by introducing appropriate dispersions (the stretched pulsed laser appears as a chirped pulsed laser in the time domain), and then the stretched chirped signal light and another narrow-band pump light of high-energy (typical pulse duration is about several tens of picoseconds) are subjected to parametric amplification in a nonlinear crystal; in this process, the energy is transferred from the pump light to the signal light, and the signal light is amplified and the idler light is generated at the same time; the amplified signal light is recompressed into a femtosecond pulsed laser by dispersion compensation.

Phase matching (hereinafter referred to as PM) is the fundamental requirement for optical parameter amplification. In the process of optical parameter amplification, phase matching is conducive to the continuous transfer of energy from pump light to signal light, thereby greatly improving the conversion efficiency of the pump light. However, in general, the phase-matching conditions are sensitive to wavelength and temperature. Deviations in wavelength and temperature will destroy the original satisfied phase-matching condition and lead to the decrease of the conversion efficiency of the optical parametric amplifier.

For OPCPA, on the one hand, the gain bandwidth is a key indicator to measure the shortest pulse laser that can be amplified. The shorter the pulse duration of the signal light, the broader spectrum it comprises, and the higher requirement for the gain bandwidth of the OPCPA is presented, i.e., the parametric gain should be insensitive to wavelength. On the other hand, the absorption of laser energy by nonlinear crystals gets more serious with the increase of the pump power, resulting in an elevated temperature of the nonlinear crystals and an uneven distribution of the refractive index so that it is impossible to satisfy the phase-matching condition within the whole non-linear crystal. This thermally induced phase mismatch seriously affects the conversion efficiency of the optical parameter amplification which is requested to be insensitive to temperature. Therefore, the broadband optical parametric chirped pulse amplifiers with a high average pump power is demand to be wavelength-insensitive and temperature-insensitive at the same time.

The inventors have found that in the prior art, the gain bandwidth or the temperature bandwidth of the optical parametric chirped pulse amplifier can be significantly improved in a non-collinear phase-matching configuration with specified non-collinear angles. However, in the prior art, the non-collinear phase-matching configuration insensitive to wavelength has different requirements on the non-collinear angles to those of the non-collinear phase-matching configuration insensitive to temperature. Therefore, it is generally impossible that the wavelength-insensitive phase-matching condition and the temperature-insensitive phase-matching condition be simultaneously realized in the same non-collinear phase-matching configuration, which leads to a reduction in the conversion efficiency and a restricted gain bandwidth of the broadband optical parametric chirped pulse amplifier with a high average pump power.

SUMMARY

The main object of the present disclosure is to provide a broadband optical parametric chirped pulse amplifier insensitive to temperature, and aims to solve the technical issue in the prior art that it is generally impossible that the wavelength-insensitive phase-matching condition and the temperature-insensitive phase-matching condition be simultaneously realized in the same non-collinear phase-matching configuration.

In order to solve the above technical issue, the technical solutions provided by the present disclosure are as follows:

A broadband optical parametric chirped pulse amplifier insensitive to temperature comprises the first pulsed laser, the second pulsed laser, a pulse stretcher, and a periodically poled nonlinear crystal, wherein the signal light generated by the first pulsed laser passes through the pulse stretcher, and then is coupled with the pump light generated by the second pulsed laser in the periodically poled nonlinear crystal, during the coupling process, the energy is transferred from the pump light to the signal light to amplify the power of the signal light and generate an idler light, wherein the signal light, the pump light and the idler light passing through the periodically poled nonlinear crystal are non-collinear, and the non-collinear angles therebetween simultaneously satisfy the angular relationship required for constructing the non-collinear phase-matching configuration insensitive to wavelength and that required for constructing the non-collinear phase-matching configuration insensitive to temperature, the periodic grating of the periodically poled nonlinear crystal has the ability to constitute a wave-vector quadrangle with the wave vectors of $k_s(T_0)$, $k_p(T_0)$, $k_i(T_0)$ and $k_g$, wherein the $k_s(T_0)$ represents the wave vector of the signal light at the central wavelength and the preset phase-matching temperature $T_0$, and the $k_p(T_0)$ represents the wave vector of the pump light at the central wavelength and the preset phase-matching temperature $T_0$, and the $k_i(T_0)$ represents the wave vector of the idler light at the central wavelength and the preset phase-matching temperature $T_0$, and the $k_g=2\pi/\Lambda$ represents the grating wave vector of the periodically poled nonlinear crystal, wherein the $\Lambda$ represents the grating period of the periodically poled nonlinear crystal.

The angular relationship required for constructing the non-collinear phase matching configuration insensitive to wavelength is:

$$v_i \cos \beta = v_s$$

wherein $v_i$ represents the group velocity of the idler light, and $v_s$ represents the group velocity of the signal light;

the angular relationship required for constructing the non-collinear phase matching configuration insensitive to temperature is:

$$\frac{\partial k_p(T)}{\partial T}\bigg|_{T=T_0} \cos(\alpha+\beta) - \frac{\partial k_s(T)}{\partial T}\bigg|_{T=T_0} \cos \beta = \frac{\partial k_i(T)}{\partial T}\bigg|_{T=T_0}$$

wherein $\alpha$ represents an included angle between the transmission directions of the pump light and the signal light, $\beta$ represents an included angle between the transmission directions of the signal light and the idler light, $k_p(T)$ represents the temperature-dependent wave vector of the pump light, $k_s(T)$ represents the temperature-dependent wave vector of the signal light, $k_i(T)$ represents the temperature-dependent wave vector of the idler light, $T_0$ represents the preset phase-matching temperature of the periodically poled nonlinear crystal, and T represents the operating temperature of the periodically poled nonlinear crystal.

The tilted angle of the periodically poled nonlinear crystal is adjustable.

The broadband optical parametric chirped pulse amplifier insensitive to temperature further comprises a reflecting mirror, and the pump light generated by the second pulsed laser passes through the reflecting mirror, and then is coupled with the signal light passing through the pulse stretcher in the periodically poled nonlinear crystal.

The broadband optical parametric chirped pulse amplifier insensitive to temperature further comprises a pulse compressor, and the amplified signal light is compressed by the pulse compressor.

The periodically poled nonlinear crystal is a periodically poled lithium niobate crystal that satisfies a Type-0 quasi-phase matching condition, wherein the periodically poled lithium niobate crystal is 5% molar magnesium oxide (MgO) doped.

The first pulsed laser is a femtosecond pulsed laser.

The first pulsed laser is a mid-infrared femtosecond pulsed laser or a Ti: sapphire femtosecond pulsed laser.

The second pulsed laser is a picosecond pulsed laser.

Via the proper arrangement of the non-collinear angles between the transmission directions of the signal light, the pump light and the idler light to simultaneously satisfy the angular relationship required for constructing the non-collinear phase-matching configuration insensitive to wavelength and that required for constructing the non-collinear phase-matching configuration insensitive to temperature, the above broadband optical parametric chirped pulse amplifier insensitive to temperature not only can realize a broadband parametric amplification of the signal light (insensitive to wavelength), but also can effectively alleviate the phase mismatch in nonlinear crystal resulted from the excessively high local temperature (insensitive to temperature). The designable periodic grating of the periodically poled nonlinear crystal has the ability to constitute a wave-vector quadrangle with the wave vectors of $k_s(T_0)$, $k_p(T_0)$, $k_i(T_0)$ and $k_g$, so that the optical parametric chirped pulse amplifier can also meet the essential requirement of phase matching. Since the phase-matching condition of the optical parametric chirped pulse amplifier is simultaneously wavelength-insensitive and temperature-insensitive, both of the peak power and the average power of the amplified pulsed laser can be significantly increased.

BRIEF DESCRIPTION OF THE DRAWINGS

In order to more clearly explain the embodiments of the present disclosure or the technical solutions in the prior art, the drawings used in the embodiments or the description of the prior art will be briefly introduced below. Obviously, the drawings in the following description are merely some embodiments of the present disclosure. For those skilled in the art, other drawings can be obtained based on these drawings without paying creative labor.

10. a broadband optical parametric chirped pulse amplifier insensitive to temperature; 1. the first pulsed laser; 2. the second pulsed laser; 3. a pulse stretcher; 4. a periodically poled nonlinear crystal; 5. a reflecting mirror; 6. a pulse compressor; 7, a signal light; 8, a pump light; 9, an idler light.

DESCRIPTION OF THE EMBODIMENTS

In order to make the objectives, features, and advantages of the present disclosure more obvious and understandable, the technical solutions in the embodiments of the present disclosure will be described clearly and completely in combination with the drawings in the embodiments of the present disclosure. Obviously, the described embodiments are merely some embodiments of the present disclosure, rather than all the embodiments. Based on the embodiments of the present disclosure, all other embodiments, which are obtained by those skilled in the art without paying creative labor, fall into the scope of protection of the present disclosure.

Figure 1:
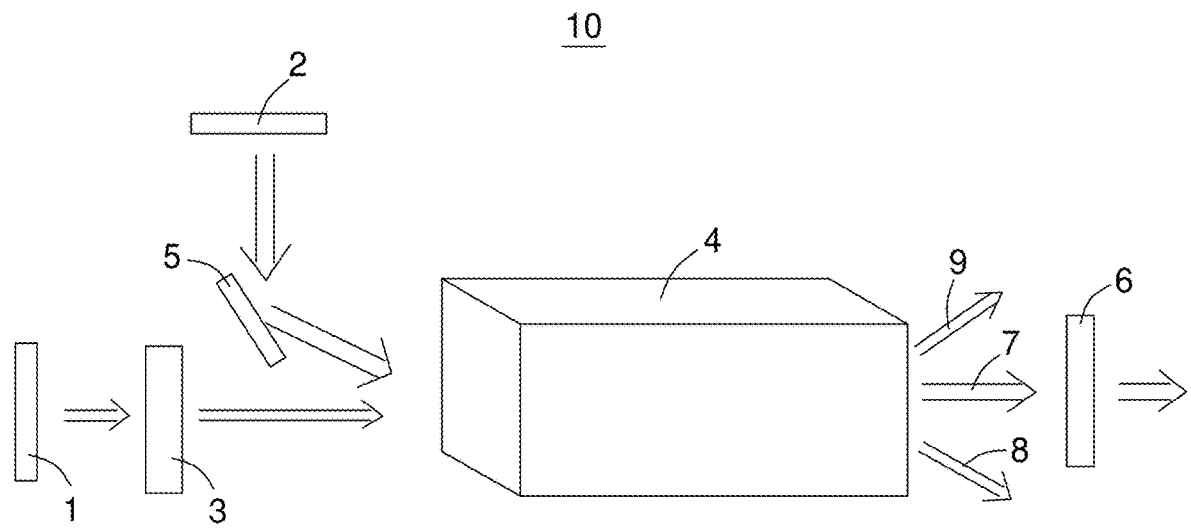
FIG. 1 is a schematic diagram illustrating a broadband optical parametric chirped pulse amplifier insensitive to temperature according to an embodiment of the present disclosure.

FIG. 1 is a schematic diagram illustrating a broadband optical parametric chirped pulse amplifier insensitive to temperature according to an embodiment of the present disclosure.

As can be seen from the figure, the broadband optical parametric chirped pulse amplifier 10 insensitive to temperature comprises the first pulsed laser 1, the second pulsed laser 2, a pulse stretcher 3 and a periodically poled nonlinear crystal 4. The signal light generated by the first pulsed laser 1 passes through the stretcher 3, and then is coupled with the pump light generated by the second pulsed laser 2 in the periodically poled nonlinear crystal 4. During the coupling process, the energy is transferred from the pump light to the signal light to amplify the power of the signal light and generate an idler light, wherein the signal light 7, the pump light 8 and the idler light 9 passing through the periodically poled nonlinear crystal 4 are non-collinear, and the non-collinear angles therebetween simultaneously satisfy the angular relationship required for constructing the non-collinear phase-matching configuration insensitive to wavelength and that required for constructing the non-collinear phase-matching configuration insensitive to temperature. The periodic grating of the periodically poled nonlinear crystal 4 has the ability to constitute a wave-vector quadrangle with the wave vectors of $k_s(T_0)$, $k_p(T_0)$, $k_i(T_0)$ and $k_g$, wherein the $k_s(T_0)$ represents the wave vector of the signal light 7 at the central wavelength and the preset phase-matching temperature $T_0$, and the $k_p(T_0)$ represents the wave vector of the pump light 8 at the central wavelength and the preset phase-matching temperature $T_0$, and the $k_i(T_0)$ represents the wave vector of the idler light 9 at the central wavelength and the preset phase-matching temperature $T_0$, and the $k_g = 2\pi/\Lambda$ represents the grating wave vector of the periodically poled nonlinear crystal 4, wherein the Λ represents the grating period of the periodically poled nonlinear crystal 4.

In the present embodiment, via the proper arrangement of the non-collinear angles between the transmission directions of the signal light 7, the pump light 8 and the idler light 9, to simultaneously satisfy the angular relationship required for constructing the non-collinear phase-matching configuration insensitive to wavelength and that required for constructing the non-collinear phase-matching configuration insensitive to temperature, the above broadband optical parametric chirped pulse amplifier insensitive to temperature 10 not only can realize a broadband parametric amplification of the signal light (insensitive to wavelength), but also can effectively alleviate the phase mismatch in nonlinear crystal resulted from the excessively high local temperature (insensitive to temperature). The designable periodic grating of the periodically poled nonlinear crystal 4 has the ability to constitute a wave-vector quadrangle with the wave vectors of $k_p(T_0)$, $k_s(T_0)$, $k_i(T_0)$ and $k_g$, so that the optical parametric chirped pulse amplifier 10 can also meet the essential requirement of phase matching. Since the phase-matching condition of the optical parametric chirped pulse amplifier 10 is simultaneously wavelength-insensitive and temperature-insensitive, both of the peak power and the average power of the amplified pulsed laser can be significantly increased.

In this embodiment, the angular relationship required for constructing the non-collinear phase matching configuration insensitive to wavelength is:

$$v_i \cos \beta = v_s$$

wherein $v_i$ represents the group velocity of the idler light, and $v_s$ represents the group velocity of the signal light.

The angular relationship required for constructing the non-collinear phase matching configuration insensitive to temperature is:

$$\frac{\partial k_p(T)}{\partial T}\bigg|_{T=T_0} \cos(\alpha + \beta) - \frac{\partial k_s(T)}{\partial T}\bigg|_{T=T_0} \cos \beta = \frac{\partial k_i(T)}{\partial T}\bigg|_{T=T_0}$$

wherein α represents an included angle between the transmission directions of the pump light 8 and the signal light 7, β represents an included angle between the transmission directions of the signal light 7 and the idler light 9, $T_0$ represents the preset phase-matching temperature of the periodically poled nonlinear crystal 4, and T represents the operating temperature of the periodically poled nonlinear crystal 4, $k_s(T)$ represents the temperature-dependent wave vector of the signal light 7, $k_p(T)$ represents the temperature-dependent wave vector of the pump light 8, and $k_i(T)$ represents the temperature-dependent wave vector of the idler light 9.

In the present embodiment, the optical parametric chirped pulse amplifier 10 may have a reflecting mirror 5, and the pump light generated by the second pulsed laser 2 is reflected after passing through the reflecting mirror 5. The signal light generated by the first pulsed laser 1 is temporally stretched after passing through the pulse stretcher 3. The pump light passing through the reflecting mirror 5 and the signal light passing through the pulse stretcher 3 are coupled in the periodically poled nonlinear crystal 4.

In the present embodiment, the optical parametric chirped pulse amplifier 10 may have a pulse compressor 6, and the amplified signal light is compressed by the pulse compressor 6 to an ultra-short pulsed laser with an ultra-intense peak power.

In this embodiment, the first pulsed laser 1 is a 3.4 μm mid-infrared femtosecond pulsed laser with a pulse duration of 35 fs. The 3.4 μm signal light emitting from the first pulsed laser 1 is temporally stretched to a chirped pulsed laser of 10 ps after passing through the pulse stretcher 3. The second pulsed laser 2 is a 1064 nm picosecond pulsed laser with a pulse duration of 15 ps, and the 1064 nm pump light emitting from the second pulsed laser 2 is reflected after passing through the reflecting mirror 5.

Figure 2:
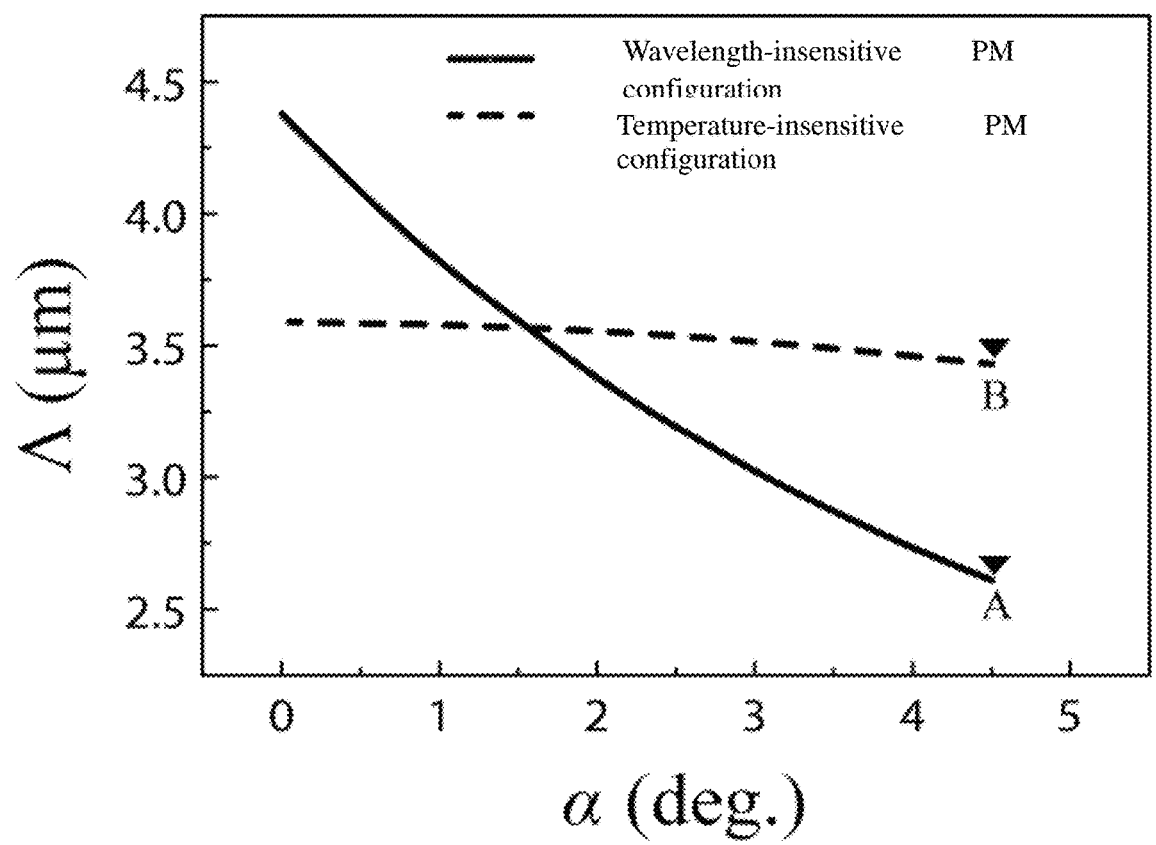
FIG. 2 is a graph illustrating a variation of a grating period $\Lambda$ with a non-collinear angle $\alpha$ between transmission directions of a pump light and a signal light according to an embodiment of the present disclosure.

As shown in FIG. 2, in the present embodiment, the periodically poled nonlinear 4 is a periodically poled lithium niobate crystal (PPLN) that satisfies a Type-0 quasi-phase matching condition, wherein the periodically poled lithium niobate crystal is 5% molar magnesium oxide (MgO) doped.

At a preset operating temperature of 24.5° C., a 3.4 μm pulsed laser is used as the signal light, a 1064 nm pulsed laser is used as the pump light, and a 5% doped MgO:PPLN crystal is used as the periodically poled nonlinear crystal 4. On the premise that the angular relationship required for constructing the non-collinear phase matching configuration insensitive to wavelength is satisfied, there is a one-to-one grating period Λ as the non-collinear angle α is altered. And so does the non-collinear phase matching configuration insensitive to temperature. Such two variation curves of the a-dependent grating period intersect at a specific non-collinear angle (α≈1.5°). That is, based on the non-collinear angle α and the grating period Λ at this intersection point, an optical parametric chirped pulse amplifier 10 capable of both wavelength-insensitive and temperature-insensitive can be constructed. Specifically, the included angle α between the transmission directions of the pump light 8 and the signal light 7 is 1.5°, and the included angle β between the transmission directions of the signal light 7 and the idler light 9 is 9.3°. Accordingly, in order to satisfy the Type-0 quasi-phase matching condition, the tilted angle τ between the grating direction of the periodically poled nonlinear crystal 4 and the transmission direction of the signal light 7 is 79.7°, and the grating period Λ is 3.6 μm.

In order to verify the performance of the optical parametric chirped pulse amplifier 10 of the present embodiment, it is assumed that the beam diameter of the 3.4 μm chirped pulsed laser is 1 mm, the length of the periodically poled nonlinear crystal 4 is 5 mm, the pump intensity is 450 MW/cm$^2$, and the initial intensity of the 3.4 μm chirped pulsed laser is 1‰ of that of the pump light. According to the refractive index formula of the 5% doped MgO: PPLN crystal, the performance of the optical parametric chirped pulse amplifier 10 is numerically simulated. In order to highlight its superiority, the simulated results is made a contrast to the those of the optical parametric chirped pulse amplifier only insensitive to temperature (corresponding to point B in FIG. 2, the tilted angle τ is 83.6°, the grating period Λ is 3.4 μm, α is 4.5°, and β is 5.5°) and the optical parametric chirped pulse amplifier only insensitive to wavelength (corresponding to point A in FIG. 2, the tilted angle τ is 83.3°, the grating period Λ is 2.6 μm, α is 4.5°, and β is 9.3°).

Figure 3A:
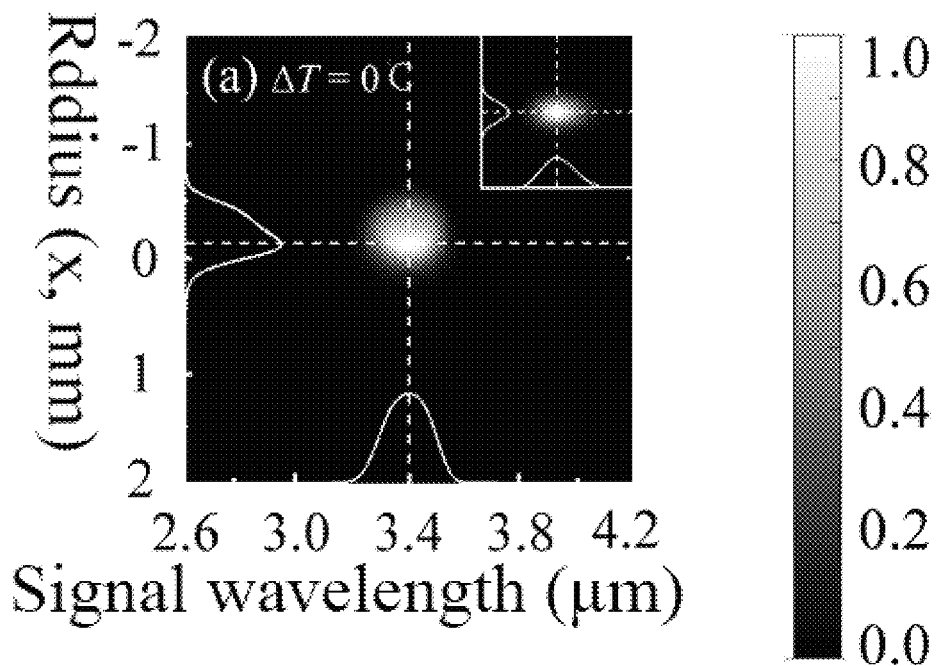
FIGS. 3A-3C are spatial-spectral profiles of the amplified signal lights based on optical parametric chirped pulse amplifiers with three different phase-matching configurations at a preset phase-matching temperature according to an embodiment of the present disclosure, wherein the illustration is the spatial-spectral profile of an initial signal light.
Figure 3B:
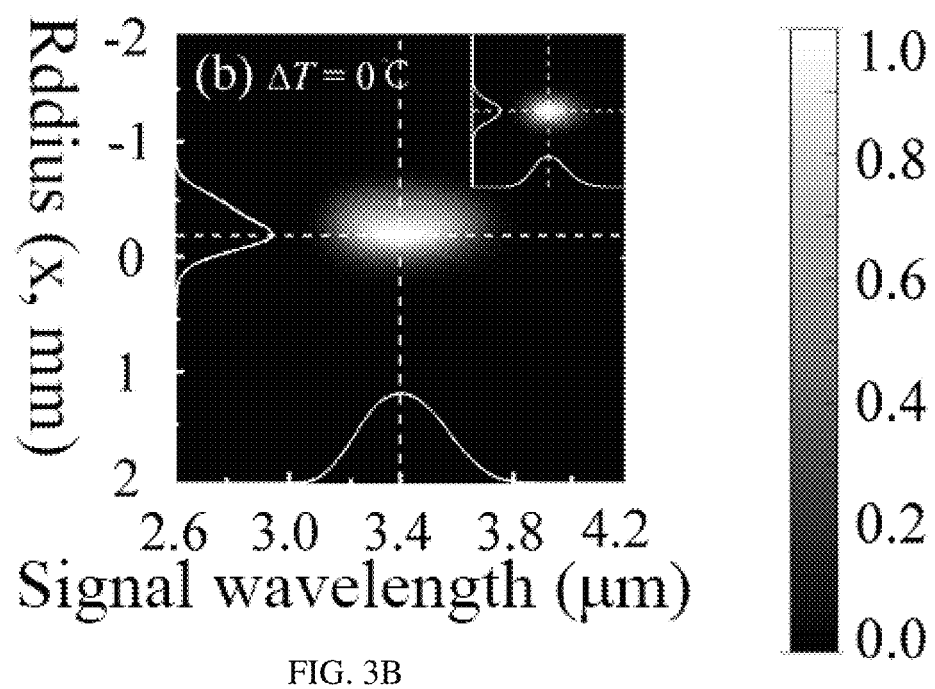
Figure 3C:
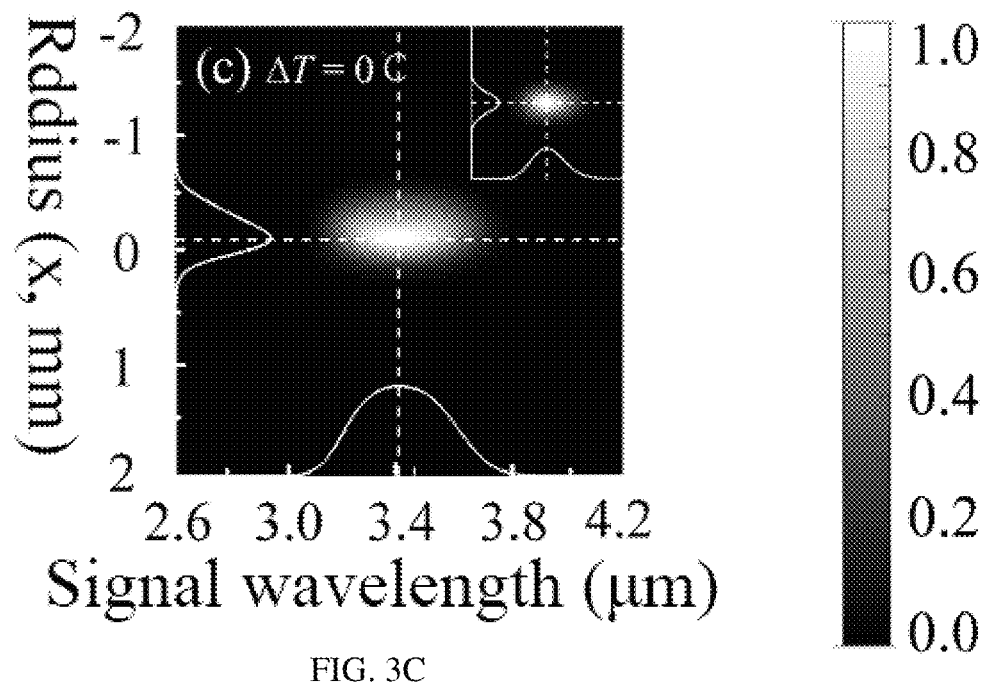

As shown in FIGS. 3A-3C, the initial spectral bandwidth of the signal light 7 is ~420 nm. At a preset phase-matching temperature (ΔT=0° C.), since the optical parametric chirped pulse amplifier only insensitive to wavelength (FIG. 3B) and the optical parametric chirped pulse amplifier 10 of the present embodiment (FIG. 3C) both satisfy the broadband phase-matching condition, similar conversion efficiencies of 42% and 40% respectively are obtained. Correspondingly, the spectral bandwidth of the amplified signal light 7 is 390 nm and 380 nm respectively, which has basically retained its original spectrum characteristics; since the optical parametric chirped pulse amplifier only insensitive to temperature (FIG. 3A) does not satisfy the broadband phase-matching condition, severe gain-narrowing effect is observed, the conversion efficiency is only 20.6%, and the spectral bandwidth of the amplified signal light 7 is only 185 nm.

Figure 3D:
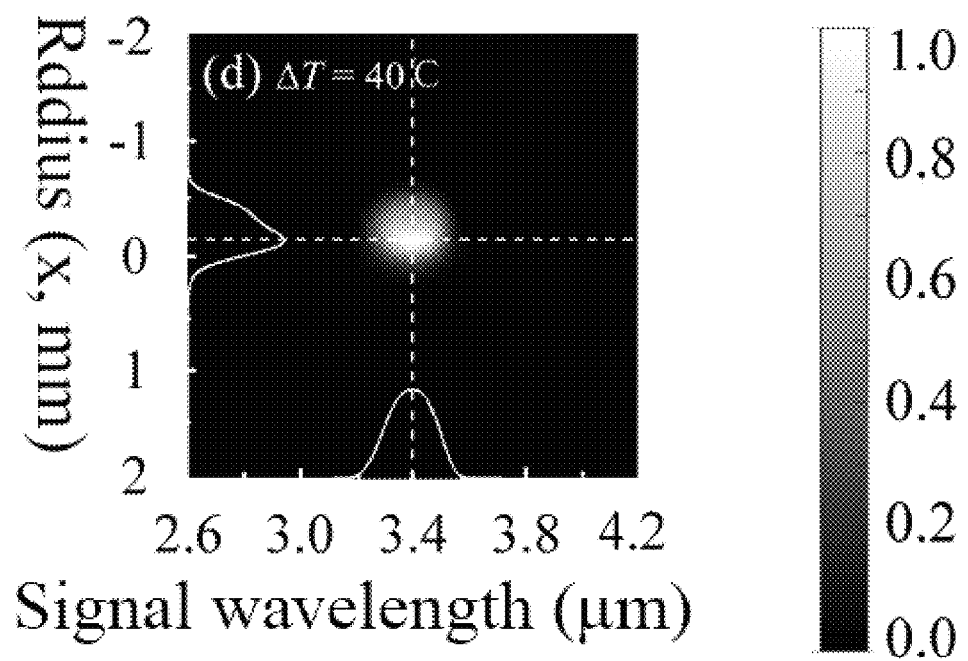
FIGS. 3D-3F are spatial-spectral profiles of the amplified signal lights based on optical parametric chirped pulse amplifiers with three different phase-matching configurations at a deviated temperature from the preset phase-matching temperature according to an embodiment of the present disclosure, wherein the illustration is the spatial-spectral profile of an initial signal light.
Figure 3E:
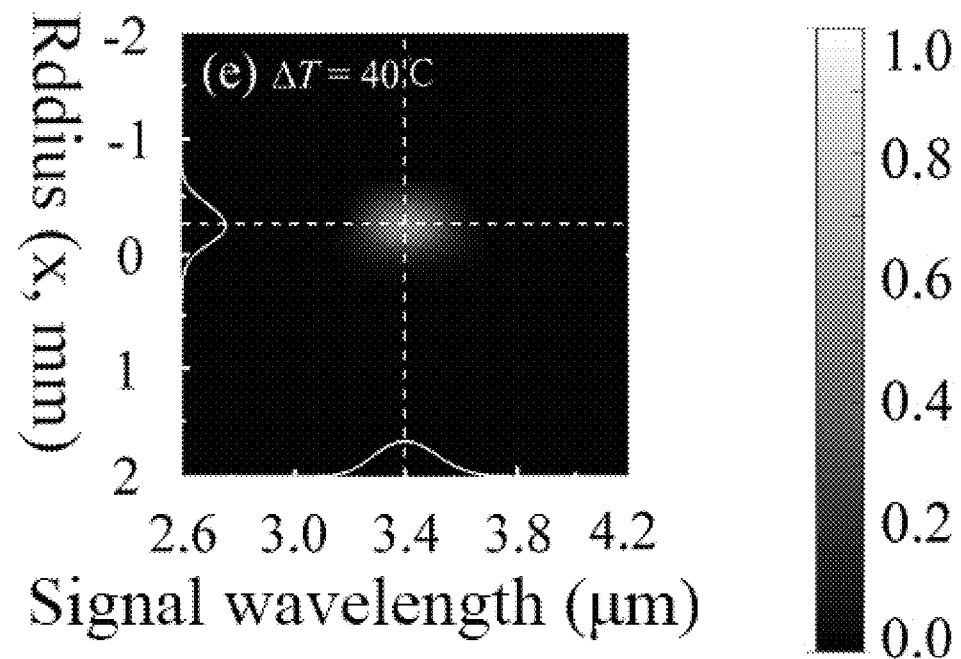
Figure 3F:
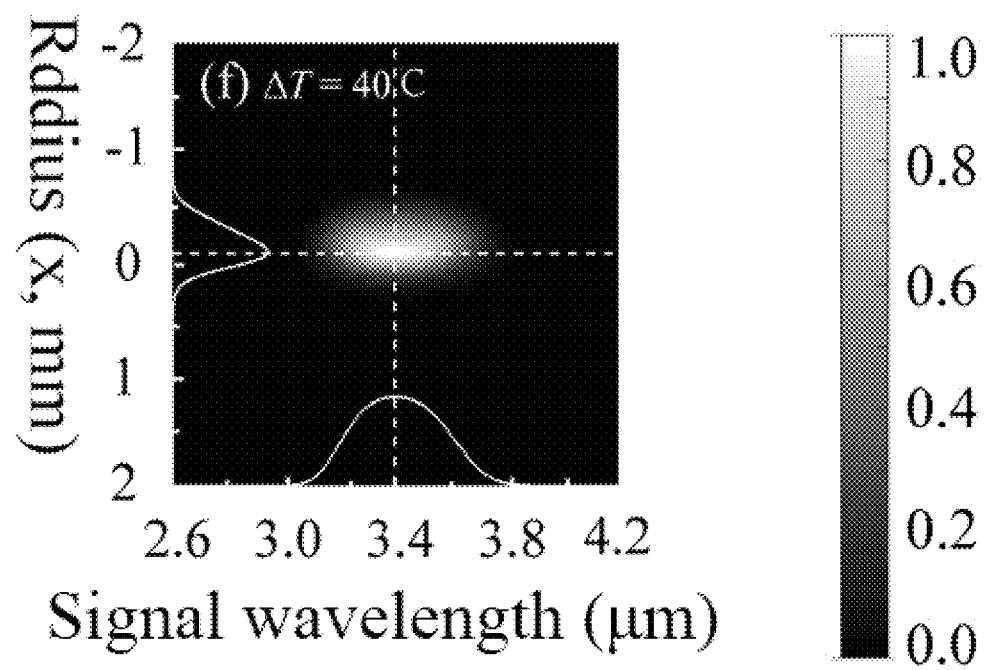

In a high average power situation, the absorption of laser energy by the periodically poled nonlinear crystal 4 will cause its actual operating temperature to deviate from the preset operating temperature. As shown in FIGS. 3D-3F, when the temperature is elevated to 62.5° C. (ΔT=40° C.), compared to these phase-matching cases at a room temperature, there is no obvious difference on both of the conversion efficiency and the amplified spectrum of the output signal light 7, for both of the optical parametric chirped pulse amplifier only insensitive to temperature (FIG. 3D) and the optical parametric chirped pulse amplifier 10 of the present embodiment (FIG. 3F). By comparison, the conversion efficiency of the optical parametric chirped pulse amplifier only insensitive to wavelength (FIG. 3E) decreases from the original 42% to only 12%, and the spectral bandwidth of the amplified signal light 7 also decreases significantly from the original 390 nm to 210 nm, indicating that this parametric amplifier is very sensitive to temperature and cannot adapt to the application requirements for the high average power optical parametric chirped pulse amplification.

Figure 4A:
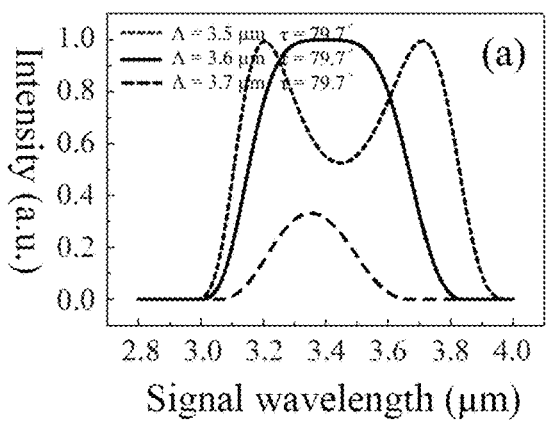
FIGS. 4A-4B are graphs illustrating the gain spectrum and the temperature bandwidth of a broadband optical parametric chirped pulse amplifier insensitive to temperature according to an embodiment of the present disclosure when the grating period $\Lambda'$ has an error with respect to a preset value $\Lambda$.
Figure 4B:
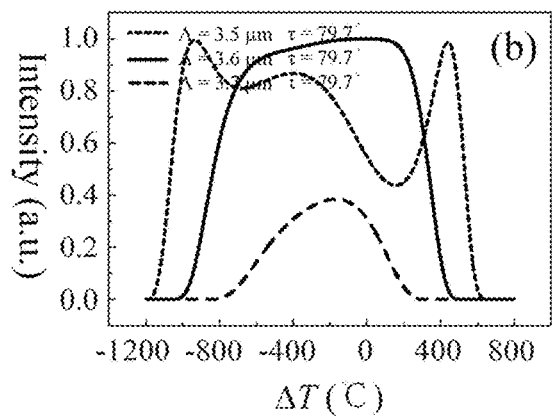
Figure 4C:
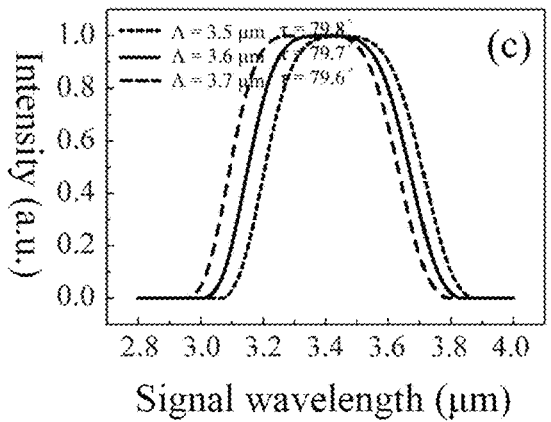
FIGS. 4C-4D are graphs illustrating the gain spectrum and the temperature bandwidth of a broadband optical parametric chirped pulse amplifier insensitive to temperature according to an embodiment of the present disclosure when the grating period $\Lambda'$ has an error with respect to a preset value $\Lambda$, which is obtained by adjusting the tilted angle of the periodically poled nonlinear crystal.
Figure 4D:
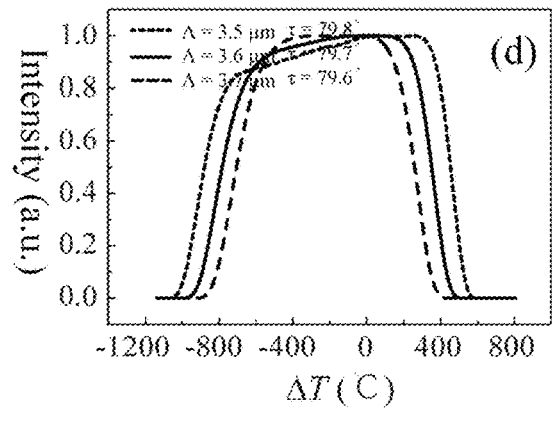
Figure 5:
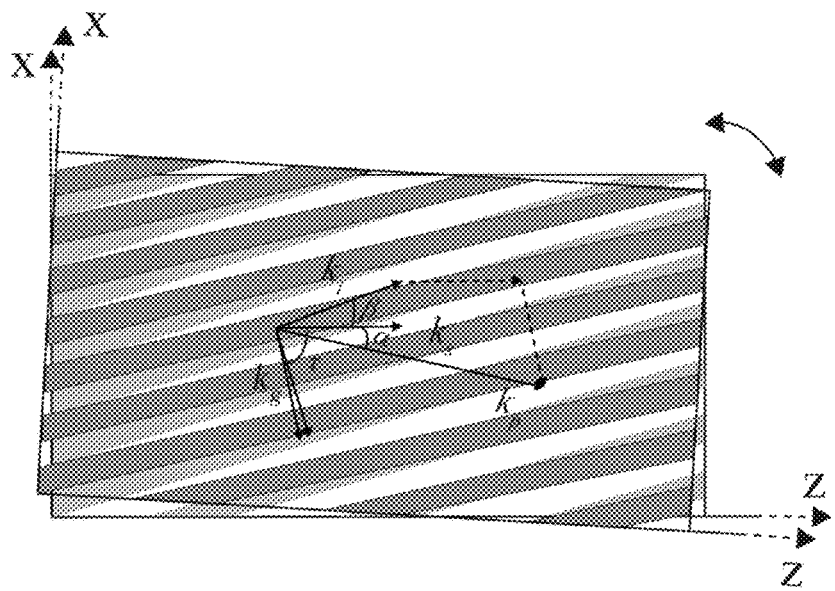
FIG. 5 is a schematic diagram illustrating the tilted angle modulation of the periodically poled nonlinear crystal in the horizontal dimension according to an embodiment of the present disclosure.

The inventors have found that, in practical applications, there will be a certain grating error between the grating structure of the produced periodically poled nonlinear crystal and the required, thereby affecting the performance of the optical parametric chirped pulse amplifier. The adverse effect of the error in grating period Λ of the periodically poled nonlinear crystal 4 on the optical parametric chirped pulse amplifier 10 is described below. It is assumed that the periodically poled nonlinear crystal 4 has no grating error in the tilted angle τ, and that the included angle α between the transmission directions of the pump light 8 and the signal light 7 stays constant. As shown in FIGS. 4A-4B, only if the grating period Λ' of the periodically poled nonlinear crystal 4 deviates from the preset value Λ, both the gain spectrum and the temperature bandwidth of the optical parametric chirped pulse amplifier 10 should be significantly deteriorated. Such deterioration gets more serious as the grating error increases. In the present embodiment, the tilted angle τ of the periodically poled nonlinear crystal 4 is adjustable by tilting the periodically poled nonlinear crystal 4, and the adverse effect of the error in grating period Λ on the performance of the optical parametric chirped pulse amplifier 10 can be significantly reduced. As shown in FIGS. 4C-4D, by appropriately adjusting the tilted angle of the periodically poled nonlinear crystal 4 in the horizontal dimension (as shown in FIG. 5), the gain spectrum and the temperature bandwidth in which significant distortion has originally occurred are obviously improved. The above result indicates that by adjusting the tilted angle of the periodically poled nonlinear crystal 4, in terms of the most conservative estimation, such performance degradation resulted from the grating error of the periodically poled nonlinear crystal 4 can be compensated when the error rate is less than 5%.

In an alternative embodiment, the first pulsed laser 1 is an 800 nm Ti: sapphire femtosecond pulsed laser. The second pulsed laser 2 is a 532 nm picosecond pulsed laser. Specifically, at this time, the included angle α between the transmission directions of the pump light 8 and the signal light 7 is 7.2°, and the included angle β between the transmission directions of the signal light 7 and the idler light 9 is 15.4°. Correspondingly, in order to satisfy the Type-0 quasi-phase matching condition, the included angle ti between the grating direction of the periodically poled nonlinear crystal 4 and the transmission direction of the signal light 7 is 80.6°, and the grating period Λ is 1.2 μm.

The broadband optical parametric chirped pulse amplifier insensitive to temperature provided by the present disclosure is described above. For those skilled in the art, according to the idea of the embodiments of the present disclosure, there will be changes in both the specific implementation and the scope of application. In summary, the content of this description should not be construed as a limitation on the present disclosure.

What is claimed is:

1. A broadband optical parametric chirped pulse amplifier, capable of tolerating temperature variation in a certain range without changing an already satisfied phase-matching condition, comprising a first pulsed laser, a second pulsed laser, a pulse stretcher and a periodically poled nonlinear crystal, wherein a signal light generated by the first pulsed laser passes through the pulse stretcher, and then is coupled with a pump light generated by the second pulsed laser in the periodically poled nonlinear crystal, during a coupling process, energy is transferred from the pump light to the signal light to amplify power of the signal light and generate an idler light, wherein the signal light, the pump light and the idler light passing through the periodically poled nonlinear crystal are non-collinear, and non-collinear angles therebetween simultaneously satisfy an angular relationship required for constructing a non-collinear phase-matching configuration capable of tolerating wavelength variation in a certain range and that required for constructing a non-collinear phase-matching configuration capable of tolerating temperature variation in the certain range;

the periodically poled nonlinear crystal is a periodically poled lithium niobate crystal that satisfies a Type-0 quasi-phase matching condition, wherein the periodically poled lithium niobate crystal is 5% molar magnesium oxide (MgO) doped, a periodic grating of the periodically poled nonlinear crystal has an ability to constitute a wave-vector quadrangle with $k_s(T_0)$ represents a wave vector of the signal light at its central wavelength and a preset phase-matching temperature $T_0$, and $k_p(T_0)$ represents a wave vector of the pump light at its central wavelength and the preset phase-matching temperature $T_0$, and the $k_i(T_0)$ represents a wave vector of the idler light at its central wavelength and the preset phase-matching temperature $T_0$, and $k_g=2\pi/\Lambda$ represents a grating wave vector of the periodically poled nonlinear crystal, wherein $\Lambda$ represents a grating period of the periodically poled nonlinear crystal.

2. The broadband optical parametric chirped pulse amplifier of claim 1, wherein the angular relationship required for constructing the non-collinear phase-matching configuration capable of tolerating wavelength variation in the certain range is:

$$v_i \cos \beta = v_s,$$

wherein $v_i$ represents a group velocity of the idler light, and $v_s$ represents a group velocity of the signal light;

the angular relationship required for constructing the non-collinear phase-matching configuration capable of tolerating temperature variation in the certain range is:

$$\frac{\partial k_p(T)}{\partial T}\bigg|_{T=T_0} \cos(\alpha+\beta) - \frac{\partial k_s(T)}{\partial T}\bigg|_{T=T_0} \cos \beta = \frac{\partial k_i(T)}{\partial T}\bigg|_{T=T_0},$$

wherein $\alpha$ represents an included angle between transmission directions of the pump light and the signal light, $\beta$ represents an included angle between transmission directions of the signal light and the idler light, $k_p(T)$ represents a temperature-dependent wave vector of the pump light, $k_s(T)$ represents a temperature-dependent wave vector of the signal light, $k_i(T)$ represents a temperature-dependent wave vector of the idler light, $T_0$ represents the preset phase-matching temperature of the periodically poled nonlinear crystal, and $T$ represents an operating temperature of the periodically poled nonlinear crystal.

3. The broadband optical parametric chirped pulse amplifier of claim 1, wherein a tilted angle of the periodically poled nonlinear crystal is adjustable.

4. The broadband optical parametric chirped pulse amplifier of claim 1, wherein the optical parametric chirped pulse amplifier further comprises a reflecting mirror, the pump light generated by the second pulsed laser passes through the reflecting mirror, and then is coupled with the signal light passing through the pulse stretcher in the periodically poled nonlinear crystal.

5. The broadband optical parametric chirped pulse amplifier of claim 1, wherein the optical parametric chirped pulse amplifier further comprises a pulse compressor, the amplified signal light is compressed by the pulse compressor.

6. The broadband optical parametric chirped pulse amplifier of claim 1, wherein the first pulsed laser is a femtosecond pulsed laser.

7. The broadband optical parametric chirped pulse amplifier of claim 6, wherein the first pulsed laser is a mid-infrared femtosecond pulsed laser or a Ti: sapphire femtosecond pulsed laser.

8. The broadband optical parametric chirped pulse amplifier claim 1, wherein the second pulsed laser is a picosecond pulsed laser.

* * * * *